United States Patent
Piech et al.

(10) Patent No.: US 9,376,295 B2
(45) Date of Patent: Jun. 28, 2016

(54) ELEVATOR BRAKE DEVICE INCLUDING PERMANENT MAGNET BIAS TO APPLY A BRAKING FORCE

(75) Inventors: Zbigniew Piech, Cheshire, CT (US); Wojciech Szelag, Poznan (PL)

(73) Assignee: Otis Elevator Company, Farmington, CT (US)

( * ) Notice: Subject to any disclaimer, the term of this patent is extended or adjusted under 35 U.S.C. 154(b) by 1429 days.

(21) Appl. No.: 12/742,259

(22) PCT Filed: Dec. 10, 2007

(86) PCT No.: PCT/US2007/086899
§ 371 (c)(1),
(2), (4) Date: May 11, 2010

(87) PCT Pub. No.: WO2009/075669
PCT Pub. Date: Jun. 18, 2009

(65) Prior Publication Data
US 2010/0252379 A1    Oct. 7, 2010

(51) Int. Cl.
*F16D 65/28* (2006.01)
*B66D 5/30* (2006.01)
*B66D 5/14* (2006.01)
*F16D 121/20* (2012.01)
*F16D 65/18* (2006.01)

(52) U.S. Cl.
CPC .. *B66D 5/30* (2013.01); *B66D 5/14* (2013.01); *F16D 65/18* (2013.01); *F16D 2121/20* (2013.01)

(58) Field of Classification Search
USPC .......................... 188/156, 161, 162, 163, 164
See application file for complete search history.

(56) References Cited

U.S. PATENT DOCUMENTS

| 2,886,149 | A | 5/1959 | Baermann |
| 3,512,618 | A | 5/1970 | Schafer |
| 3,642,104 | A | 2/1972 | Schafer |
| 3,730,317 | A | 5/1973 | Jaeschke |
| 3,741,353 | A | 6/1973 | McKinley et al. |
| 4,717,865 | A | 1/1988 | Caputo |
| 4,811,820 | A | 3/1989 | Rossi |
| 5,121,018 | A | 6/1992 | Oldakowski |
| 5,443,132 | A | 8/1995 | Arnold |

(Continued)

FOREIGN PATENT DOCUMENTS

| DE | 86 15 856 | * 11/1987 | ................ H01F 7/16 |
| EP | 693633 A2 | * 1/1996 | ............... F16D 63/00 |

(Continued)

OTHER PUBLICATIONS

Machine Translation of DE 86 15 856.*

(Continued)

*Primary Examiner* — Nicholas J Lane
(74) *Attorney, Agent, or Firm* — Carlson, Gaskey & Olds

(57) ABSTRACT

An exemplary elevator brake device includes a permanent magnet. A core supports the permanent magnet. A first plate is positioned near one side of the core with a first gap between the first plate and the core. A second plate is positioned near another side of the core with a second gap between the second plate and the core. The first and second plates remain fixed relative to each other and are arranged such that relative movement is possible between the core and the plates. An electromagnet selectively influences an amount of magnetic flux across the first and second gaps, respectively, to control a braking force of the brake.

25 Claims, 3 Drawing Sheets

(56) References Cited

U.S. PATENT DOCUMENTS

| | | | |
|---|---|---|---|
| 5,467,850 A | 11/1995 | Skalski | |
| 6,471,017 B1 | 10/2002 | Booz et al. | |
| 8,151,950 B2* | 4/2012 | Fargo | 188/164 |
| 2002/0100646 A1* | 8/2002 | Maurice et al. | 188/161 |
| 2008/0136279 A1* | 6/2008 | Berndt et al. | 310/93 |

FOREIGN PATENT DOCUMENTS

| | | |
|---|---|---|
| GB | 743328 | 1/1956 |
| JP | 56138528 A | 10/1981 |
| JP | 511394 | 3/1993 |
| JP | 7335434 A | 12/1995 |
| JP | 2000230593 A | 8/2000 |
| JP | 2002003095 A | 1/2002 |
| JP | 2004353684 A | 12/2004 |
| JP | 2006256763 A | 9/2006 |
| JP | 2007161466 A | 6/2007 |

OTHER PUBLICATIONS

International Preliminary Report on Patentability for International application No. PCT/US2007/086899 mailed Jun. 24, 2010.

International Search Report and Written Opinion of the International Searching Authority for International application No. PCT/US2007/086899 mailed Nov. 5, 2008.

* cited by examiner

ELEVATOR BRAKE DEVICE INCLUDING PERMANENT MAGNET BIAS TO APPLY A BRAKING FORCE

BACKGROUND

Elevator systems include an elevator car that moves vertically to carry passengers, cargo or both to various levels within a building or structure. There are different arrangements for propelling the elevator car and supporting it within a hoistway. Most systems include a brake that is used to stop the elevator car and hold it in a desired position.

In traction-based elevator systems, for example, an elevator machine assembly includes a motor, a drive for controlling operation of the motor and a traction sheave that is driven by the motor to cause desired movement of the elevator car. A load bearing assembly (e.g., round ropes or flat belts) supports the weight of the elevator car and follows the fraction sheave such that movement of the traction sheave causes corresponding movement of the elevator car. The brake operates on a brake rotor disk, which is coupled with the traction sheave, to control the speed at which the sheave rotates or to prevent movement of the sheave (and the elevator car) to meet the needs of a particular situation.

There are a variety of elevator brake arrangements that have been used. Typical brakes include mechanical springs that force an axially moveable plate against the brake rotor having brake lining material. The resulting friction between the movable plate and the lining material stops and holds the elevator in place. Engagement of the moveable plate is known in the art as "dropping the brake" and is typically the default condition. Releasing the brake is known in the art as "lifting the brake." Typical arrangements include a solenoid for causing movement against the bias of the mechanical springs to move the moveable plate out of engagement. The force generated by the solenoid overcomes the force of the springs and pulls the moveable plate away from the brake rotor.

Using a solenoid for moving the plate is inherently unstable in that acceleration changes with a change in the gap between the moveable plate and the associated components (e.g., as the moveable plate moves out of or into engagement). Magnetic fields increase as the ferromagnetic parts (e.g., the moveable plate and a housing that supports the electromagnet) come closer together, tending to create an acceleration of the movable plate. The plate typically moves through an air gap of approximately 0.3 mm between an engaged (i.e., dropped) and a disengaged (i.e., lifted) position. If the magnetic field decays too quickly when dropping the brake, for example, then the movable plate is accelerated by the springs into contact with the brake rotor. The uncontrollable acceleration of the plate though the air gap and resulting contact with the brake rotor or housing can result in objectionable noise that can be heard within the elevator car.

Attempts to reduce such noise include the use of O-rings to dampen movement, reduce the impact, and reduce noise. Disadvantageously, the O-rings are subject to creep, stress relaxation and aging. Over time these factors degrade the O-rings causing a noticeable increase in noise, along with a reduction in the force that engages the brake. The increase in noise and reduction in engagement force ultimately requires readjusting the brake torque and replacing the O-rings to maintain the desired operation and noise dampening characteristics. Additionally, typical arrangements require initially setting the torque higher than otherwise required to compensate for the eventual degradation of the O-rings. Such over-design of an elevator brake introduces additional costs. Other known devices include the use of an elastomeric bumper or pad. Such devices also suffer from the limited life span associated with the O-rings.

SUMMARY

An exemplary elevator brake device includes a permanent magnet. A core supports the permanent magnet. A first plate is positioned near one side of the core with a first gap between the first plate and the core. A second plate is positioned near another side of the core with a second gap between the second plate and the core. The first and second plates remain fixed relative to each other and are arranged such that relative movement is possible between the core and the plates. An electromagnet selectively influences an amount of magnetic flux across the first and second gaps, respectively, to control a braking force of the brake.

An exemplary method of controlling an elevator brake, which has a permanent magnet that applies a braking force and an electromagnet supported by a core with a first plate near a first side of the core and a second plate near a second side of the core with a gap between each plate and the core, includes establishing a first, respective magnetic flux density in the gaps for applying the braking force. A second, respective magnetic flux density is established in the gaps to release the braking force.

The various features and advantages of disclosed examples will become apparent to those skilled in the art from the following detailed description. The drawings that accompany the detailed description can be briefly described as follows.

DETAILED DESCRIPTION

Figure 1:
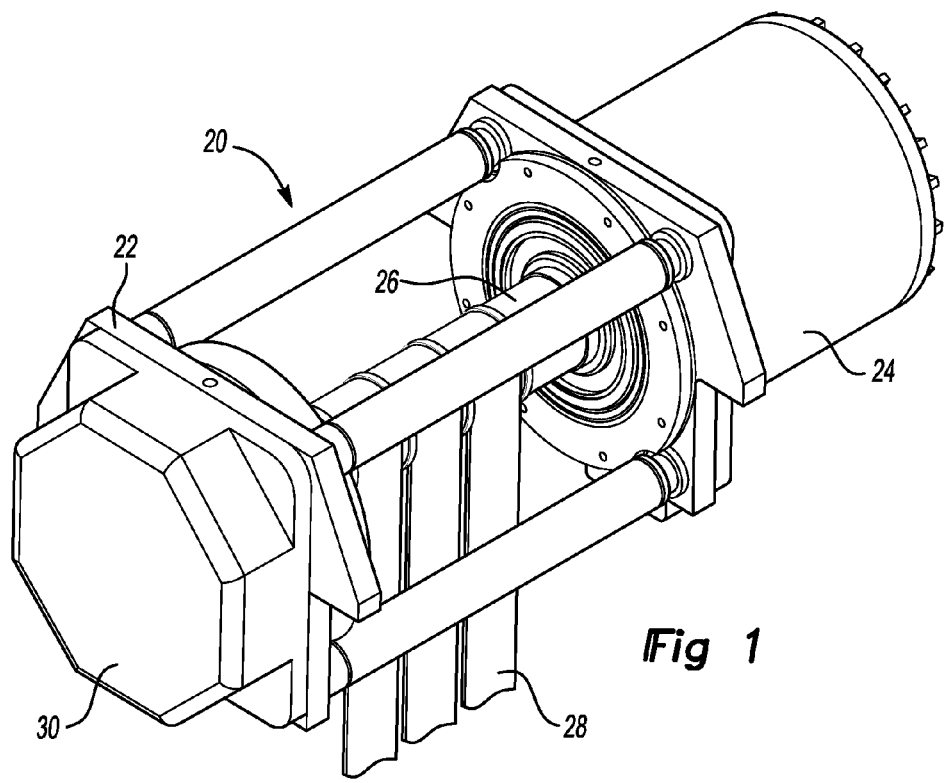
FIG. 1 schematically illustrates an example elevator machine assembly that includes a brake device designed according to an embodiment of this invention.

FIG. 1 schematically shows an elevator machine assembly 20. A frame 22 supports a motor portion 24 and a traction sheave 26. The motor 24 causes the traction sheave 26 to rotate to cause movement of load bearing members 28 (e.g., ropes or flat belts) to cause desired movement of an associated elevator car. A brake device 30 slows down or stops movement of the traction sheave 26 to maintain a desired speed or position of the associated elevator car, for example.

Figure 2:
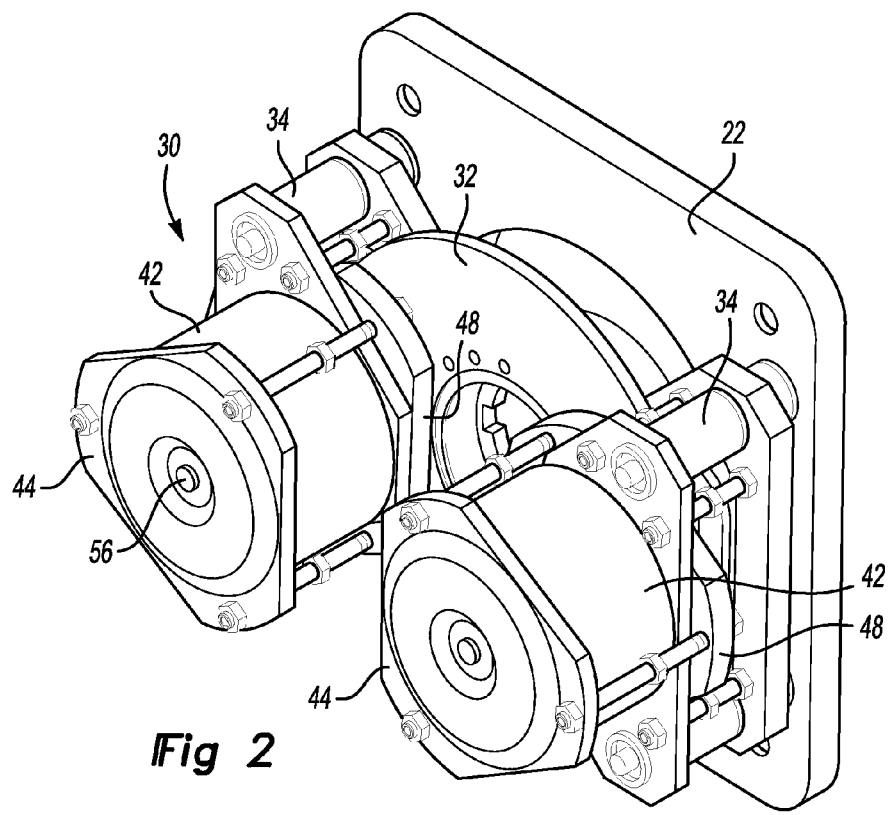
FIG. 2 is a perspective view of an example elevator brake device.
Figure 3:
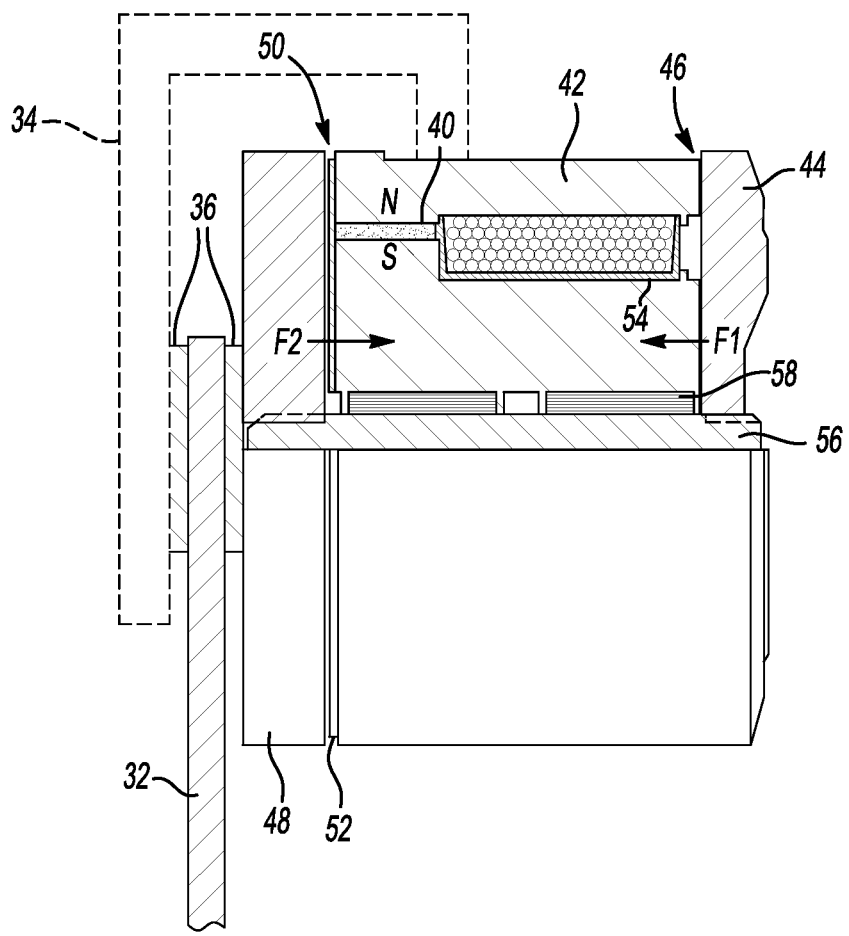
FIG. 3 is a partial cross-sectional illustration of selected portions of the example embodiment of FIG. 2.

Referring to FIGS. 2 and 3, one illustrated example brake device 30 is operative to apply a braking force to control rotation of a brake rotor disk 32 that is coupled with the traction sheave 26 such that the fraction sheave 26 and the disk 32 rotate together. A mounting member 34 secures the brake device 30 to a portion of the frame 22. The mounting member 34 ensures that the brake device 30 will not rotate relative to the frame 22 for controlling rotation of the disk 32.

The illustrated example includes a caliper-style arrangement with brake pads 36 that engage opposite sides of the disk 32 to provide resistance to rotation of the disk 32 in an amount corresponding to an amount of force used to urge the brake pads 36 into the disk 32. This example includes two caliper portions acting on the disk 32. Other examples include one while still other examples include more than two.

A permanent magnet (PM) 40 provides a magnetic field bias that applies a braking force. In other words, the PM 40 urges the brake device 30 into a dropped condition. The PM 40 is supported by a core 42. In this example, the PM 40 comprises a ring received within a corresponding portion of the core 42. The core 42 comprises a ferromagnetic material.

A first plate 44 is positioned near one side of the core 42. The first plate comprises a ferromagnetic material and in one example, comprises the same material as the core 42. The first plate 44 is spaced from the core 42 such that there is a first gap 46 between the first plate 44 and the core 42.

A second plate 48 is positioned near an opposite side of the core 42. The second plate 48 comprises a ferromagnetic material, and in one example, comprises the same material as the core 42 and the first plate 44. In this example, one of the brake pads 36 is supported on the second plate 48 while the other is situated to remain stationary relative to the frame 22. In the illustrated example, the other brake pad 36 is supported on the mounting member 34.

A second gap 50 is between the second plate 48 and the core 42. In this example, the second gap 50 comprises empty space and a spacer 52 comprising a non-magnetic material such that the size of the non-magnetic space across the gap 50 is larger than an unoccupied air space between the second plate 48 and the core 42.

In this example, the non-magnetic space across the second gap 50 is greater than that of the first gap 46. The unoccupied air space (e.g., mechanical distance) within the second gap 50, however, is smaller than or equal to that of the first gap 46. The non-magnetic spacer 52 establishes physically occupied non-magnetic space in the gap 50 that allows for such a relationship between the sizes of the first and second gaps 46 and 50.

A coil 54 is also supported by the core 42. The coil 54 and the core 42 operate as an electromagnet that influences a magnetic flux density within the gaps 46 and 50, respectively, to control how much of a braking force is applied by the brake device 30. In this example, the coil 54 selectively influences the magnetic flux density in each of the gaps 46 and 50 that otherwise results from the magnetic field of the PM 40. In this example, an amount that the electromagnet (e.g., the coil 54, core 42, first plate 44 and second plate 48) is energized (e.g., an amount of current supplied to the wire of the coil 54) controls how the electromagnet selectively influences the magnetic flux densities in the gaps 46 and 50 and, therefore, controls a braking force applied by the brake device 30.

The first plate 44 and the second plate 48 remain fixed relative to each other. The brake device 30 is designed to accommodate relative movement between the core 42 and the plates 44 and 48. In this example, the core 42 remains fixed relative to the frame 22 because of the connection with the mounting member 34. The plates 44 and 48 are moveable together relative to the core 42. In another example, the core 42 together with the mounting member 34 and the brake pad 36 is moveable relative to the plates, which remain in a fixed position relative to the frame 22.

In the illustrated example, a rod 56 connects the first plate 44 to the second plate 48. The rod 56 is received at least partially within the core 42 and slides relative to the core 42 during relative movement between the plates 44 and 48 and the core 42. The plates and the rod can be considered a plunger of the brake device 30. In this example, a bearing 58 facilitates the sliding movement of the rod 56 relative to the core 42. Another example includes a bushing to facilitate such sliding movement.

The arrangement of the plates 44 and 48 relative to the core 42 and the magnetic field of the PM 40 provides a bias on the components of the brake device 30 for applying a braking force to resist rotation of the rotor disk 32. In this example, when the coil 54 is not energized, the PM 40 biases the brake pads 36 into engagement with the rotor disk 32. In other words, when the coil 54 is not energized, the brake device 30 is in a dropped condition.

Figure 4:
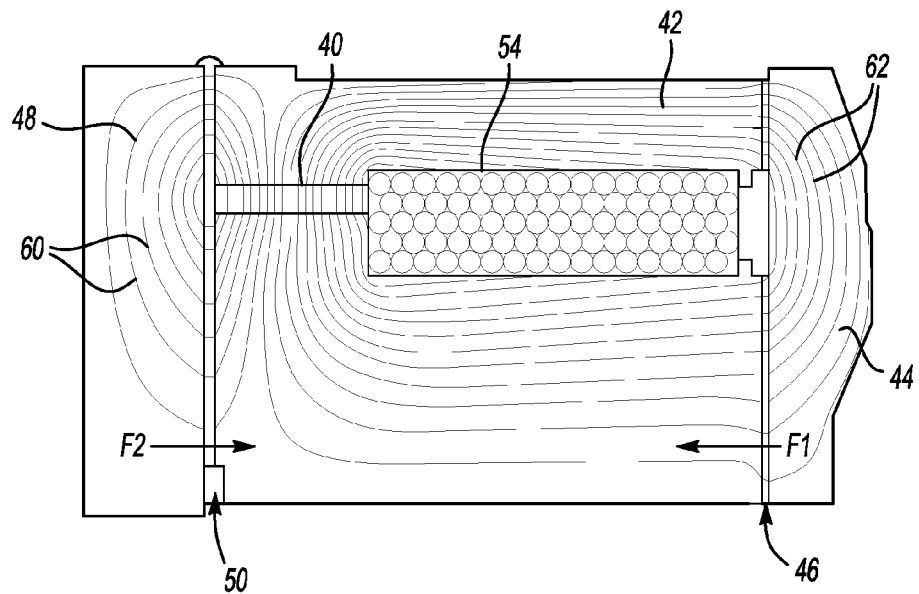
FIG. 4 is a schematic illustration of an example operating condition of the example brake device of FIG. 2.

FIG. 4 schematically illustrates such an operative state of selected portions of the brake device 30. The coil 54 is de-energized (e.g., has no current flowing through its wire) and the magnetic field of the PM 40 results in respective magnetic flux densities across the gaps 46 and 50. In this example, the magnetic field distribution lines 60 correspond to one magnetic flux across the second gap 50. The magnetic field lines 62 correspond to a different magnetic flux across the first gap 46. In this condition, the proportion of the gap sizes (e.g., the non-magnetic space across the second gap 50 is larger than the non-magnetic space across the first gap 46) causes the magnetic flux density in the second gap 50 to be smaller than that in the first gap 46. A resulting force F2 attracting the second plate 48 toward the core 42 is smaller than a resulting force F1 attracting the first plate 44 toward the core 42. Since F1 is greater than F2 and the plates 44 and 48 remain fixed relative to each other, the overall force resulting from the magnetic field of the PM 40 causes the second plate 48 and the associated brake pad 36 to move away from the core (e.g., to the left in the drawing) into engagement with the rotor disk 32 to apply a braking force to resist rotation of the disk 32 and the traction sheave 26.

In one example including magnets that are NdFeB 40 MGOe, when the size of the first gap 46 is approximately 0.3 mm, the overall size of the second gap 50 is approximately 2.1 mm and the remaining dimensions are scaled accordingly, the resulting applied braking force is approximately 5100 Newtons. Such a force is sufficient to prevent any rotation of the rotor disk 32 in many elevator systems.

Figure 5:
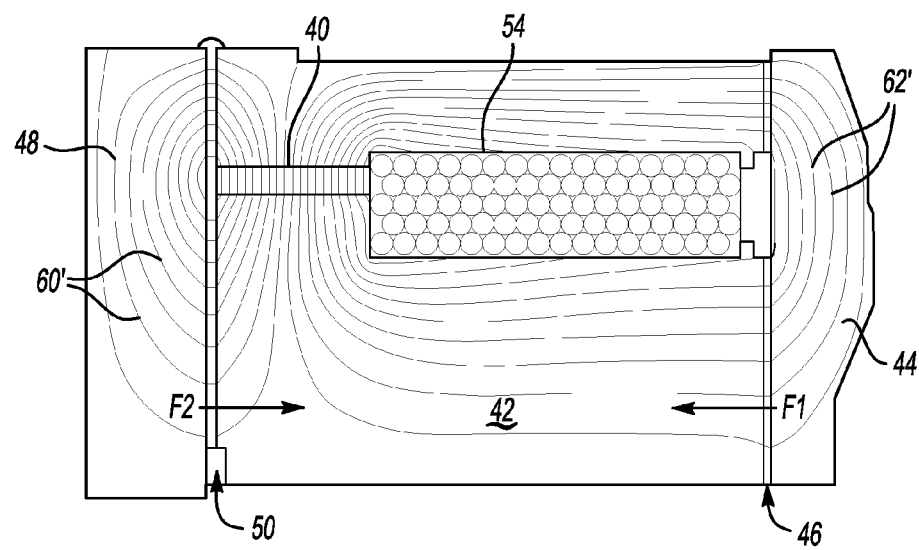
FIG. 5 is a schematic illustration of another example operating condition of the example brake device of FIG. 2.

When elevator car movement is desired, the electromagnet is energized by providing current to the wire of the coil 54. The applied current excites an electromagnetic field in the circuit that effectively shunts the magnetic field of the PM 40 to lift or disengage the brake. FIG. 5 schematically shows one such operative state of the example brake device 30. In FIG. 5, the coil 54 is energized and generates a resulting magnetic field that is within the core 42 and across the gaps 46 and 50 in addition to the magnetic field of the PM 40. In FIG. 5, the magnetic flux density across the gap 50 represented by the magnetic field lines 60' is greater than the magnetic flux density across the gap 46 represented by the magnetic field lines 62'. Accordingly, the force F2 is greater than the force F1 and the second plate 48 is urged toward the core 42. These forces result in releasing the brake force applied to the disk 32 (as the plunger moves to the right according to the drawing).

One example includes magnets that are NdFeB 40 MGOe, the first gap 46 is 0.3 mm, the second gap 50 includes a 0.6 mm unoccupied air space and a 1.5 mm spacer 52 and the remaining dimensions are scaled accordingly. An applied current of approximately 2.3 amps results in a difference between F1 and F2 of 176 N with the greater force being in the direction of F2 (according to the drawings). Such a current level is sufficient to release the brake force in such an example.

In one example, energy savings and less heat generation are possible by reducing the current used to hold off the brake in the lifted position. For example, a first current level (e.g., 2.3 amps) is applied to the wire of the coil 54 to release the brake force applied to the disk 32 and then less current is applied to the electromagnet during movement of the elevator car to maintain the brake in a lifted condition.

One feature of the illustrated example is that the arrangement of the first gap 46 and the second gap 50 and selectively controlling the current to the coil 54 allows for controlling a speed of movement of the plunger (e.g., the second plate 48 and the associated brake pad 36) to avoid undesired acceleration of the plunger and the noise that otherwise would result from impacts between the second plate 48 and the spacer 52 or the associated brake pad 36 and the rotor disk 32. In other words, the illustrated example arrangement allows for selectively controlling the speed with which the plunger moves between dropped and lifted positions to reduce or eliminate undesired noise associated with operation of the brake device 30.

Another feature of the illustrated example is that it can provide a normal braking force by operation of the PM 40 when the coil 54 is not energized. It is also possible to apply a greater braking force by energizing the electromagnet to increase the force F1 to urge the second plate 48 and the associated brake pad 36 toward the disk 32. In one example, applying a current to the coil of the coil 54 in an opposite direction used in the condition schematically shown in FIG. 4 increases the magnetic flux density across the first gap 46 to a higher level. This results in an even higher applied braking force. This feature allows the example braking device 30 to be used as a normal service brake for an elevator during normal operating conditions (using the braking force supplied by the PM 40) and as an emergency stopping device during an emergency stop condition (using the increased braking force resulting from cooperation between the magnetic fields of the PM 40 and the coil 54).

In one example, the theoretical characteristic of brake torque as a function of applied current is close to linear. Increasing the current flow in a desired direction results in a corresponding change in the braking force. Linearly increasing the current flow in a direction that increases the magnetic flux density in the first gap 46 causes a corresponding, linear increase in the braking force in one example.

One feature of the example braking device 30 is that is it capable of releasing the brake force resulting from the magnetic field of the PM 40 and is capable of increasing the brake force beyond that resulting from the magnetic field of the PM 40. One example has both capabilities and realizes them with an overall structural size that is smaller than other brake arrangements. In other words, the illustrated example is capable of releasing the brake force or increasing the brake force without requiring an increased size of the brake device. This is possible because of the illustrated type of arrangement and the manner in which the electromagnet influences the magnetic flux densities across the first and second gaps 46 and 50, respectively.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. An elevator brake device, comprising:
   a permanent magnet;
   a core supporting the permanent magnet;
   a first plate near one side of the core with a first gap between the first plate and the core;
   a second plate near another side of the core with a second gap between the second plate and the core, the first and second plates remaining fixed relative to each other, the first and second plates being arranged to permit relative movement between the core and the first and second plates; and
   an electromagnet that selectively influences an amount of magnetic flux density across the first and second gaps, respectively, to control a braking force of the brake device.

2. The device of claim 1, wherein
   the first gap comprises a first non-magnetic space between the first plate and the core;
   the second gap comprises a second non-magnetic space between the second plate and the core; and
   the second non-magnetic space is greater than the first non-magnetic space.

3. The device of claim 2, wherein the permanent magnet is closer to the second gap than the first gap.

4. The device of claim 2, comprising
   a non-magnetic spacer in the second gap such that an unoccupied physical space in the second gap is smaller than the second non-magnetic space.

5. The device of claim 2, wherein the permanent magnet has an associated magnetic field that establishes a magnetic flux density in the first and second gaps, respectively, and the magnetic flux density in the first gap is greater than the magnetic flux density in the second gap when the electromagnet is not energized such that the first plate is urged toward the core by a first force that is greater than a second force urging the second plate toward the core.

6. The device of claim 5, wherein the permanent magnet causes the first and second plates and the core to be in a position corresponding to applying a braking force when the electromagnet is not energized.

7. The device of claim 6, wherein the braking force corresponds to a difference between the first and second forces.

8. The device of claim 5, wherein a magnetic flux density decreases in the first gap and increases in the second gap responsive to a first energized condition of the electromagnet such that the first and second plates and the core are situated relative to each other and the brake device is in a released position.

9. The device of claim 8, wherein the first energized condition increases the magnetic flux density in the second gap and decreases the magnetic flux density in the first gap until the second force exceeds the first force to move the braking device into the released position.

10. The device of claim 9, wherein a second energized condition of the electromagnet is operative to maintain the brake released position and wherein the second energized condition comprises a lower electrical current in a coil of the electromagnet relative to an electrical current associated with the first energized condition.

11. The device of claim 5, wherein the magnetic flux density in the first gap increases to a higher level responsive to the electromagnet being in an increased braking energized condition such that the first plate is urged toward the core by an increased force greater than the first force.

12. The device of claim 1, comprising
    a non-magnetic rod connecting the first plate to the second plate and wherein the rod and the plates are moveable together relative to the core.

13. The device of claim 12, wherein the rod is received at least partially in the core.

14. The device of claim 13, comprising
at least one of a bushing or a bearing adjacent the rod to facilitate desired movement of the rod relative to the core.

15. The device of claim 1, comprising
a fixed brake pad;
a moveable brake pad that is urged toward the fixed brake pad responsive to a magnetic flux density across the first and second gaps, respectively.

16. The device of claim 15, wherein the moveable brake pad is supported on one of the core or one of the first or second plates.

17. The device of claim 1, comprising
a second permanent magnet;
a second core;
another first plate;
another second plate; and
a second electromagnet.

18. A method of controlling an elevator brake having a permanent magnet and an electromagnet supported by a core with a first plate near one side of the core and a second plate near another side of the core with a gap between the core and each of the plates, comprising the steps of:
establishing first respective magnetic flux densities in the gaps between the core and the first and second plates to apply a braking force; and
establishing second respective magnetic flux densities in the gaps to release the braking force.

19. The method of claim 18, wherein
the first respective magnetic flux densities correspond to a magnetic field of the permanent magnet; and
the second respective magnetic flux densities correspond to a magnetic field of the electromagnet and the magnetic field of the permanent magnet.

20. The method of claim 18, comprising
establishing third respective magnetic flux densities in the gaps to apply an increased braking force responsive to combined magnetic fields of the permanent magnet and the electromagnet.

21. The method of claim 18, wherein
the magnetic flux density in the gap between the core and the first plate urges the first plate in a first direction toward the magnets; and
the magnetic flux density in the gap between the core and the second plate urges the second plate in a second, opposite direction toward the magnets.

22. The method of claim 21, wherein
the first magnetic flux density in the gap between the core and the first plate is greater than the first magnetic flux density in the gap between the core and the second plate; and
the second magnetic flux density in the gap between the core and the second plate is greater than the second magnetic flux density in the gap between the core and the first plate.

23. The device of claim 1, wherein the first plate, the second plate and the core each comprise a ferromagnetic material; and
the magnetic flux follows a path that includes the first plate, the second plate and the core.

24. The device of claim 1, wherein
a first magnetic flux density across the first gap urges the first plate in a first direction toward the magnets; and
a second magnetic flux density in the second gap urges the second plate in a second, opposite direction toward the magnets.

25. The device of claim 24, wherein
the first magnetic flux density in the first gap is greater than the second magnetic flux density in the second gap for applying the braking force; and
the second magnetic flux density is greater than the first magnetic flux density for releasing the braking force.

* * * * *